United States Patent
McKay

[15] 3,657,955
[45] Apr. 25, 1972

[54] BLIND FASTENER WITH EXPANDABLE COLLAR
[72] Inventor: Thomas L. McKay, 11555 Bellagio Road, Los Angeles, Calif. 90049
[22] Filed: May 14, 1970
[21] Appl. No.: 37,126

[52] U.S. Cl. .................................. 85/70, 85/51, 85/73, 287/189.36 F
[51] Int. Cl. ........................................... F16b 13/06
[58] Field of Search ......................... 85/73, 74–76, 70, 85/71, 77, 78, 51, 8.6, 8.8, 75, 87; 151/41.72, 41.74, 41.73, 41.7, 69, 21 B; 287/20.3, 189.36 F

[56] References Cited

UNITED STATES PATENTS

| | | |
|---|---|---|
| 3,136,203 | 6/1964 | Davis ............................... 85/69 |
| 1,320,623 | 11/1919 | Kennedy ........................... 85/70 |
| 3,270,793 | 9/1966 | Polmon ........................... 85/70 X |
| 2,466,546 | 4/1949 | Huelster ......................... 85/73 X |
| 2,452,192 | 10/1948 | Hosking ......................... 151/21 B |
| 3,236,143 | 2/1966 | Wing ................................ 85/70 |
| 3,443,473 | 5/1969 | Tritt ................................. 85/70 |
| 3,322,449 | 5/1967 | Becker ...................... 287/189.36 F |
| 3,523,482 | 8/1970 | Ploch et al. ....................... 85/73 |
| 2,851,917 | 9/1958 | Frew et al. ........................ 85/51 |
| 2,324,142 | 7/1943 | Eklund .......................... 85/70 X |
| 2,877,818 | 3/1959 | Johnson ...................... 151/41.73 |

Primary Examiner—Ramon S. Britts
Attorney—Smyth, Roston & Pavitt

[57] ABSTRACT

The sleeve of a fastener is inserted into a bore of a workpiece and a core bolt inside the sleeve is tightened to contract the sleeve longitudinally. The longitudinal contraction causes a thin-walled neck portion of the sleeve to collapse into circumferential folds which bulge outwardly to expand a surrounding expandable collar into abutment against the far side of the workpiece.

38 Claims, 27 Drawing Figures

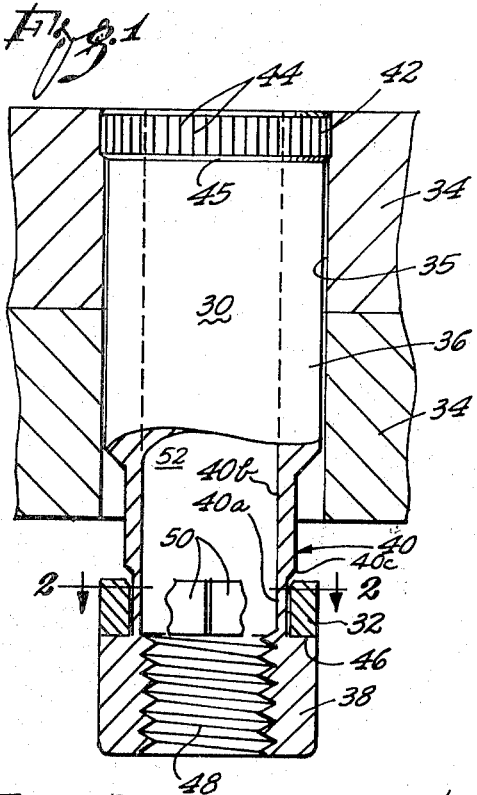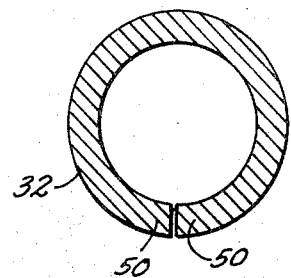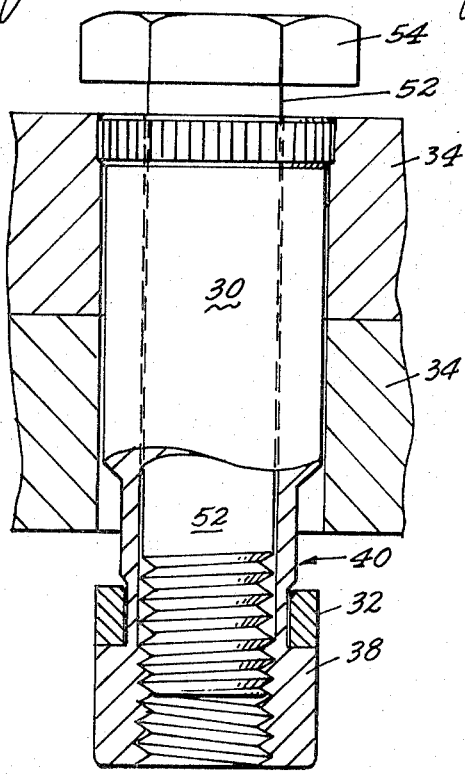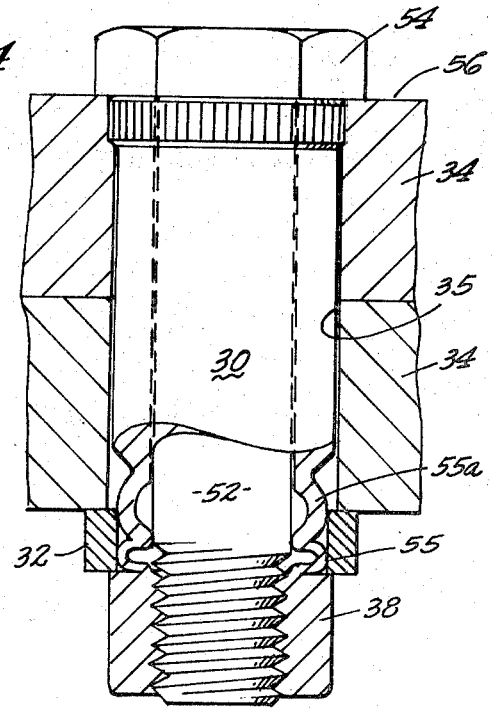

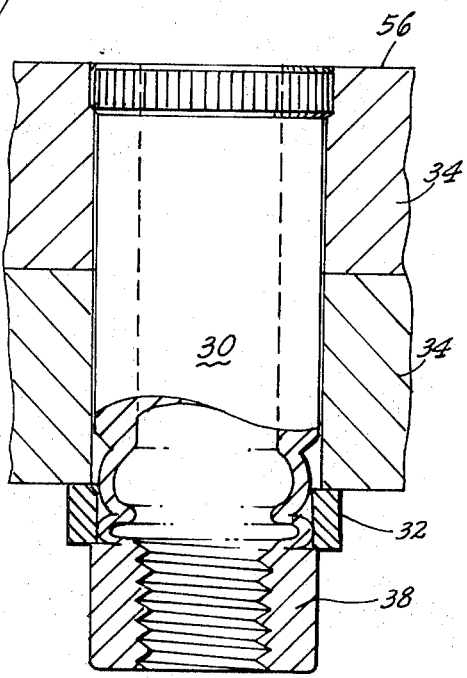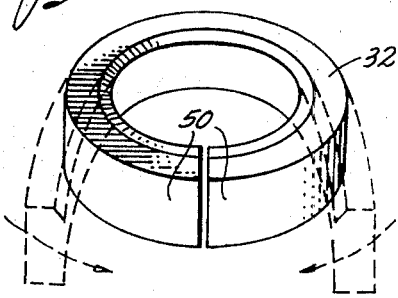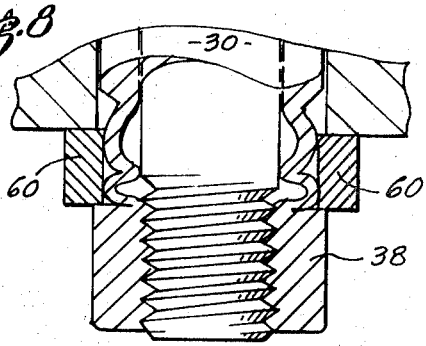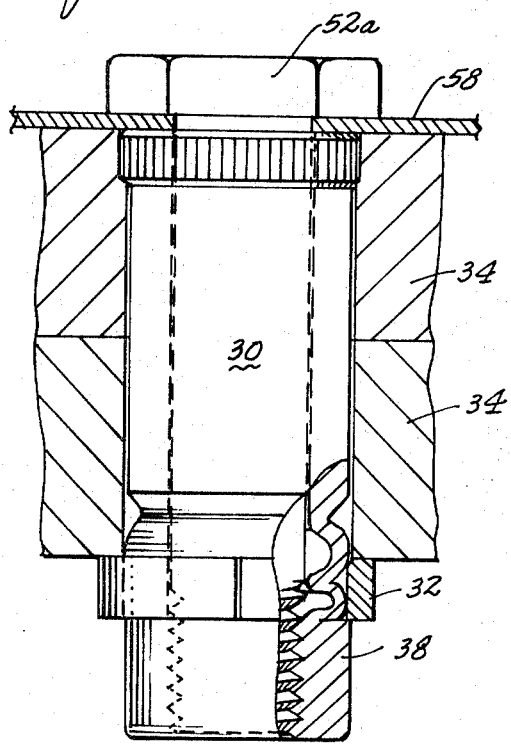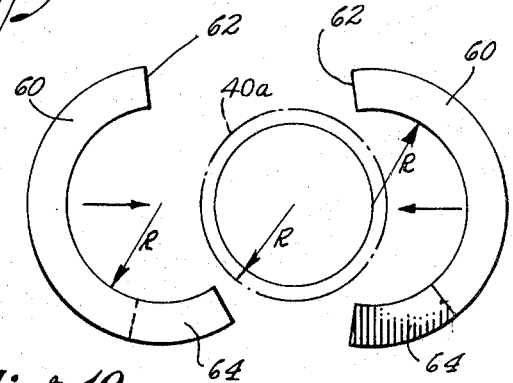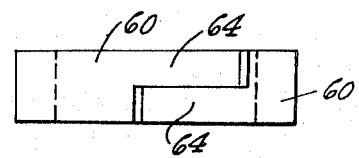

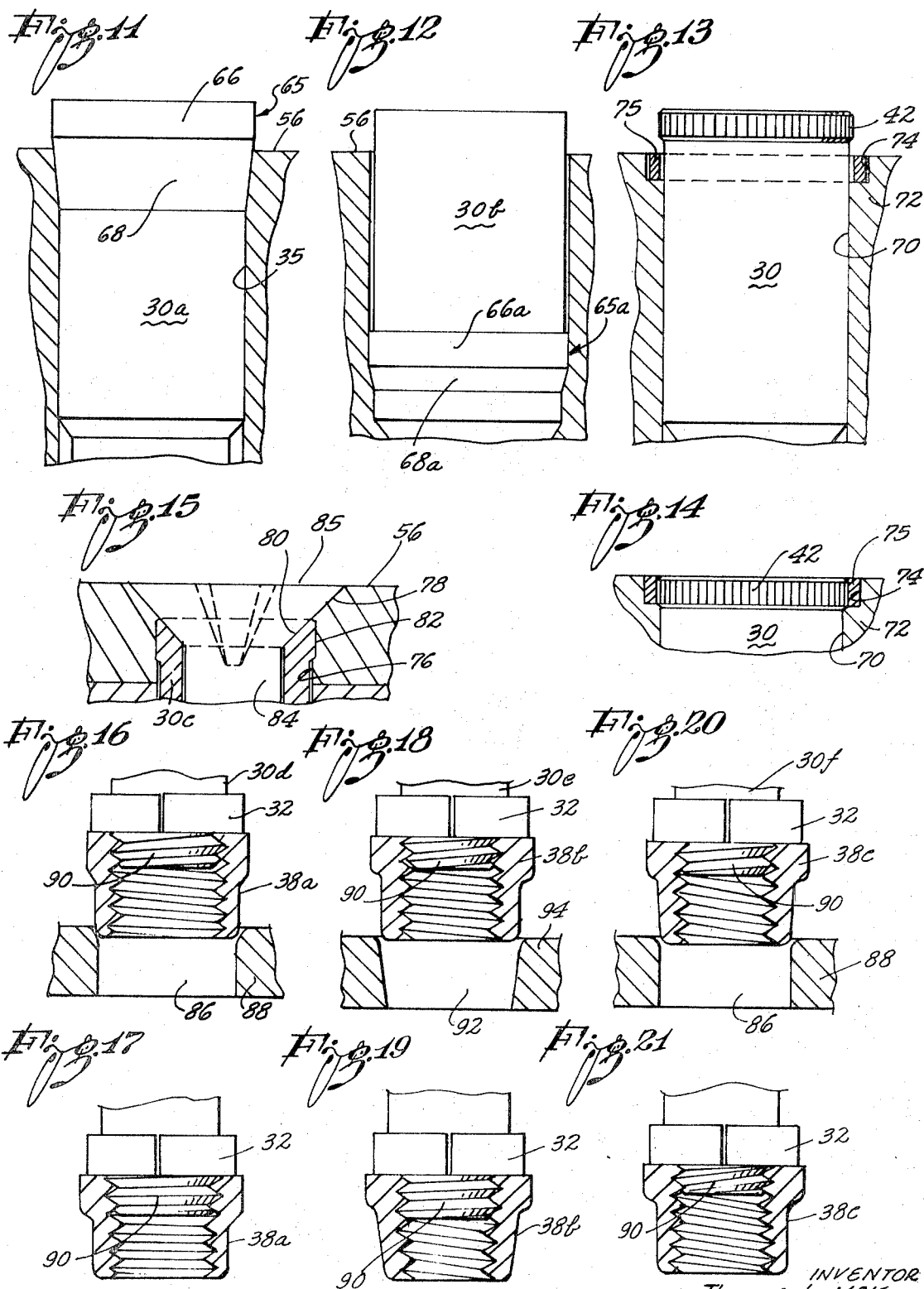

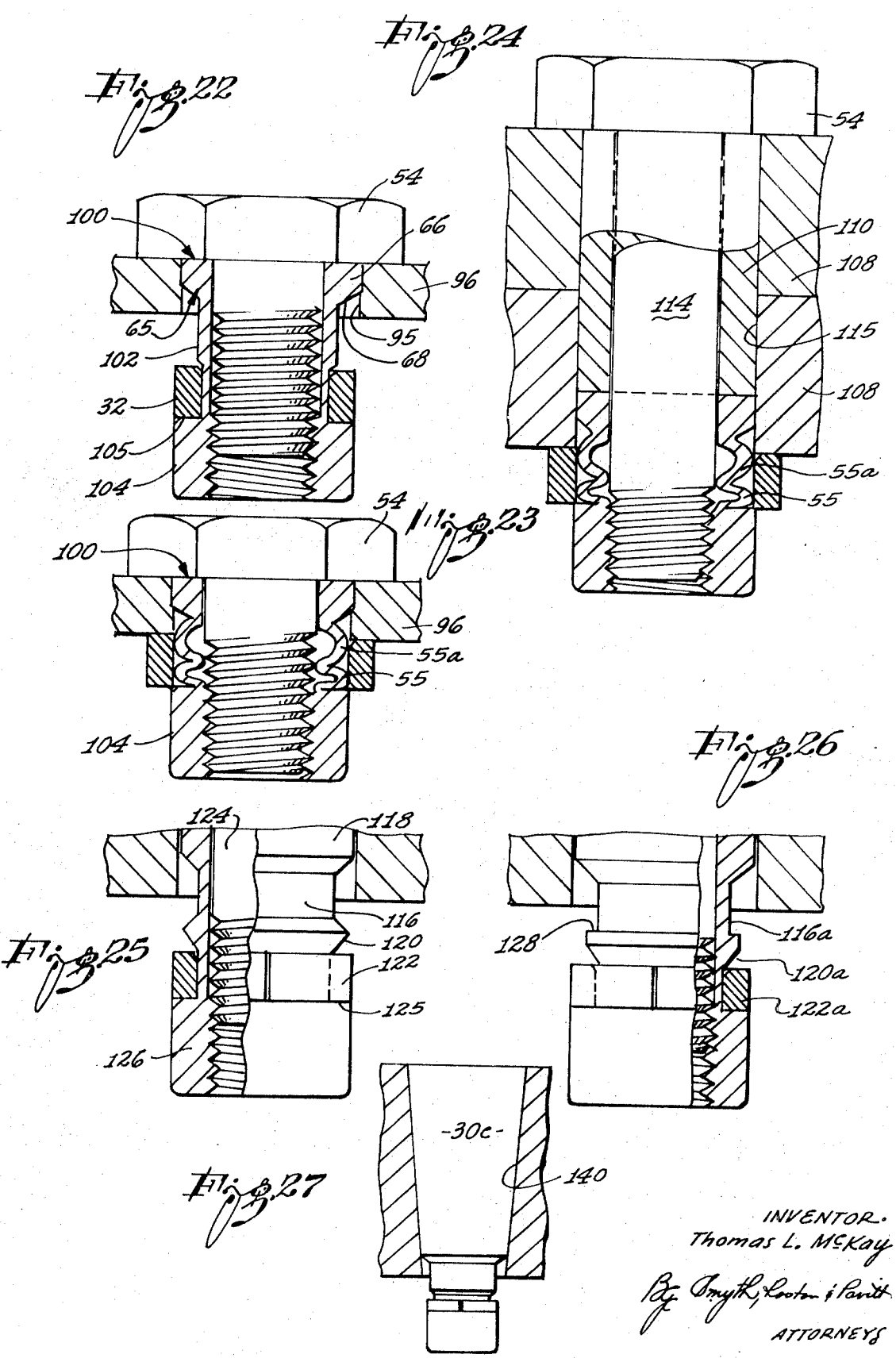

_3,657,955_

BLIND FASTENER WITH EXPANDABLE COLLAR

BACKGROUND OF THE INVENTION

The invention relates to blind fasteners of the general type disclosed in the following U.S. pat. Nos.

| | |
|---|---|
| Wing et al. | 3,129,630 |
| Reynolds | 3,277,771 |
| D'Halloy | 1,820,965 |
| Money | 3,307,444 |

The essential elements of each of these prior art fasteners comprise a sleeve to occupy a bore in a workpiece, an expandable collar and a core bolt which is employed to expand the collar into abutment with the far side of the workpiece. In each instance, the expansion of the collar is accomplished by means of a conical wedge which may be either an integral part of the sleeve or an integral part of the core bolt.

An inherent disadvantage of each of the prior art devices is that the step of contracting the sleeve axially for the purpose of expanding the collar is carried out by partially retracting the core bolt out of the surrounding sleeve so that at the end of the collar-expanding operation a substantial portion of the length of the core bolt protrudes rearwardly of the sleeve. At the end of the installation procedure this surplus end of the retracted core bolt is broken off and for this purpose the core bolt is formed with a circumferential groove to facilitate severance of the protruding end portion.

Another inherent disadvantage of the prior art devices is that a special driving tool is necessary to grip the trailing end of the core bolt for the purpose of retracting the core bolt to carry out the operation of contracting the sleeve. In the absence of such a special driving tool the devices are inoperative.

One of the objects of the present invention is to avoid the necessity of breaking off and discarding a portion of the core bolt. Another object of the invention is to avoid the necessity of employing a special driving tool and thus make it possible for any mechanic to install the blind fastener with ordinary tools. A further and important object of the invention is to provide a blind fastener which may serve, if desired, as a blind nut to make it possible to use screws of various lengths to anchor objects to a workpiece.

SUMMARY OF THE INVENTION

A basic concept of the invention is to make the core bolt serve not only as a core member but also serve as the sole means for expanding the collar by longitudinal contraction of the sleeve. In other words, it is contemplated that the core bolt itself will take over the function of the usual specialized driving tool that retracts the core bolt. When such a driving tool is used, the driving tool abuts the trailing end of the sleeve and at the same time pulls on the core bolt to place the sleeve under sufficient longitudinal compression to cause the required contraction of the sleeve. For the purpose of assuming this function of the driving tool, the core bolt is formed with a head that abuts the trailing end of the sleeve for the purpose of placing the sleeve under longitudinal compression.

The sleeve of the blind fastener is divided into three portions, namely, a main body portion, a neck portion adjacent the body portion and a nut portion adjacent the neck portion on the leading end of the sleeve. The main body portion is dimensioned to occupy the bore in the work material with the neck portion and the nut portion of the sleeve extending beyond the far side of the work material. The neck portion is both reduced in outside diameter and reduced in wall thickness and the reduced neck portion is embraced by an expandable ring. The nut portion or leading end portion of the sleeve forms a radial shoulder to cooperate with the expandable ring. When the sleeve of the fastener is contracted longitudinally by tightening of the core bolt, the neck portion collapses by forming circumferential folds which bulge outward against the inner circumference of the expandable ring and thus expand the ring sufficiently to engage the far side of the work material. Additional longitudinal contraction of the sleeve serves the further purpose of causing the radial shoulder of the neck portion to clamp the expanded ring firmly against the far side of the work material and thus anchor the blind fastener assembly against retraction from the bore in which it is mounted.

One feature of the invention is the concept of various ways of adapting the sleeve to engage the work material to limit the advance of the sleeve into the bore of the work material. For this purpose the sleeve is formed with a suitable circumferential enlargement to engage the work material.

Other features of the invention relate to the construction of the expandable ring. In one practice of the invention, the expandable ring comprises a single split ring which has a circumferential extent of more than 180° for positive engagement with the neck portion of the sleeve. In another practice of the invention, the ring means comprises two split rings with overlapping confronting ends.

An important feature of the invention is that after a core bolt has been employed to contract the sleeve longitudinally and thereby anchor the fastener assembly to the work material, the core bolt may be withdrawn to permit the sleeve of the fastener assembly to serve as a nut for attaching various objects to the work material. Thus the initial core bolt may be withdrawn and replaced by a longer core bolt that serves as means to attach an object to the work material.

The features and advantages of the invention may be understood from the foregoing description and the accompanying drawings.

BRIEF DESCRIPTION OF THE DRAWINGS

In the drawings, which are to be regarded as merely illustrative:

FIG. 1 is a view largely in section showing a sleeve and collar of a selected embodiment of the invention with the sleeve initially inserted into a bore through two workpieces;

FIG. 2 is a transverse section taken as indicated by the line 2—2 of FIG. 1 showing how the contracted expandable ring initially embraces the neck portion of the sleeve;

FIG. 3 is a view similar to FIG. 2 showing how a core bolt may be inserted into the sleeve for screw threaded engagement with the leading nut portion of the sleeve;

FIG. 4 is a view similar to FIG. 3 showing how tightening of the core bolt against both the trailing end of the sleeve and the near face of the work material causes longitudinal contraction of the sleeve with consequent formation of outwardly bulging circumferential folds in the neck portion of the sleeve, the formation of the circumferential folds serving to expand the collar and also serving to contract the sleeve to clamp the collar against the far side of the work material;

FIG. 5 is a view similar to FIG. 3 with the core bolt removed after the core bolt has served its purpose of contracting the sleeve;

FIG. 6 shows how, with the initial core bolt removed a second core bolt may be substituted for the purpose of attaching a thin plate to the near face of the work material;

FIG. 7 is a diagrammatic perspective view indicating how the two ends of a U-shaped member may be close together to form a split expandable ring embracing the neck portion of the sleeve;

FIG. 8 is a view partly in section showing how a pair of split rings may be employed to serve the function of an expandable ring;

FIG. 9 is a plan view of the pair of split rings, with the split rings separated laterally from each other;

FIG. 10 is a side elevation of the two split rings assembled together.

FIG. 11 is a view partly in side elevation and partly in section showing how a sleeve may be formed with a tapered enlargement at its trailing end for anchorage of the sleeve in the work material;

FIG. 12 is a similar view with the enlargement near the leading end of the body portion of the sleeve;

FIG. 13 is a similar view showing how the rim enlargement of the sleeve shown in FIGS. 1–6 may cooperate with a deformable ring in an annular recess around the entrance to the bore in the work material;

FIG. 14 is a view similar to FIG. 13 showing the sleeve driven into engagement with the deformable ring in the annular recess;

FIG. 15 is a fragmentary view showing how a core bolt with a tapered head may be employed to permit the head of the core bolt to be flush with the near face of the work material when the fastener is installed;

FIG. 16 is a view partly in section showing how a suitable die means may be employed to deform the nut portion of a fastener sleeve to make the nut portion capable of self-locking cooperation with a core bolt;

FIG. 17 is a similar view showing the deformed nut portion;

FIGS. 18 and 19 are similar to FIGS. 16 and 17 showing how the nut portion of the sleeve may be deformed to another configuration for self-locking cooperation with a core bolt;

FIGS. 20 and 21 are similar views showing how the nut portion of the sleeve may be deformed to a different configuration for the self-locking action;

FIG. 22 is a view partly in section and partly in side elevation showing an embodiment of the invention of relatively short axial dimension for use in a workpiece that is relatively thin;

FIG. 23 is a similar view showing the sleeve contracted longitudinally for engagement with the workpiece;

FIG. 24 is a view similar to FIG. 23 showing how an auxiliary spacer sleeve may be employed with the fastener sleeve shown in FIG. 22 for the purpose of adapting the fastener for use in thicker work material;

FIG. 25 is a fragmentary view, partly in section and partly in side elevation, showing how the neck portion of a fastener sleeve may be formed with an outer circumferential rib of V-shaped cross section to cooperate in the expanding of the ring;

FIG. 26 is a view similar to FIG. 25 showing how the neck portion of a sleeve may be formed with a circumferential enlargement of a different configuration for the same purpose; and FIG. 27 is a view similar to FIG. 11 showing how the sleeve may be anchored against rotation by slightly tapering the sleeve and driving the sleeve into a slightly tapered bore.

DESCRIPTION OF THE PREFERRED EMBODIMENTS OF THE INVENTION

With reference to FIGS. 1–7, the first embodiment of the invention comprises essentially a sleeve, generally designated 30, and a ring means 32, which is radially expanded and clamped against the far side of the work material in response to longitudinal contraction of the sleeve. In this instance, the work material comprises two plates 34 which are positioned face-to-face with a bore 35 extending through the two plates.

The sleeve 30 is divided into a main body portion 36 which is shaped and dimensioned to occupy the bore 35, a leading end portion 38 which may be termed a nut portion and a neck portion 40 which interconnects the main body portion and the nut portion. The main body portion 36 is of a length to occupy the bore 35 with the neck portion 40 and the nut portion 38 extending beyond the far side of the work material as shown in FIG. 1.

Preferably the main body portion 36 is formed with a circumferential enlargement that is shaped and dimensioned to engage the work material to resist inward axial movement of the sleeve after the sleeve is installed in the bore 35. In this first embodiment of the invention, the circumferential enlargement of the main body 45. 36 is an enlarged rim 42 that preferably is formed with serrations 44 and is also preferably formed with a tapered leading shoulder 55. When the sleeve 30 is forcibly driven into the installed position shown in FIG. 1, the tapered leading shoulder 45 facilitates entrance of the enlarged rim into the work material and the serrations 45 bite into the work material to resist rotation of the sleeve relative to the work material.

The nut portion 38 of the sleeve is formed with a rearwardly facing radial shoulder 46 which abuts the ring means 32 and the nut portion is further formed with an internal screw thread 48.

The neck portion 40 of the sleeve is substantially smaller in outside diameter than the main body portion 36 and is also of substantially thinner wall thickness than the main body portion. Preferably the neck portion 40 decreases in wall thickness by stages toward the nut portion 38 of the sleeve with the ring means 32 initially embracing the first stage. Thus, as shown in FIG. 1, the neck portion 40 has a first thin walled stage 40a that is embraced by the ring means 32 and has a second stage 40b of somewhat greater wall thickness there being a forwardly facing tapered outer circumferential shoulder 40c at the juncture of the two stages. The neck portion may be divided into more than two stages if desired.

In the first embodiment of the invention, the ring means 32 is a simple, split ring with two confronting ends 50. FIG. 7 shows how such a split ring may be initially fabricated to U-shaped configuration and indicates by arrows how the two ends of the U-shaped configuration may be bent inwardly toward each other to cause the ring means to embrace the neck portion 40 of the sleeve.

After the sleeve 30 is driven into its installed position shown in FIG. 1, by means of a hammer, or the like, a suitable the pull member or core bolt 52 is inserted into the sleeve in the manner shown in FIG. 3 and the core bolt is screwed into engagement with the internal screw thread 48 of the nut portion 38. Once the core bolt 52 is in firm engagement with the internal screw thread 48, a wrench is applied to the hexagonal head 54 of the core bolt to draw on the nut portion 38 and thus contract the sleeve 30 longitudinally. The engagement of the serrations 40 with the work material prevents rotation of the sleeve by the rotation of the core bolt and the head 54 of the core bolt reacts against the trailing end of the sleeve to cause the desired longitudinally contraction of the sleeve.

The forcible longitudinal contraction of the sleeve 30 causes the sleeve to buckle in the region of the neck portion 40 and if the neck portion is divided into stages the buckling occurs at the stages in sequence. Since the core bolt 52 prevents radially inwardly buckling of the neck portion 40, the neck portion must buckle radially outwardly. Consequently, the neck portion 40 of the sleeve collapses into successively formed outwardly bulging circumferential folds. Thus first the first stage 40a of the neck portion 40 buckles outwardly to form at least one circumferential fold 55 as shown in FIG. 4, the outward buckling of the sleeve expanding the ring means 32 from an initial configuration having an outside diameter slightly less than the inside diameter of the bore 35 to a final expanded configuration having an outside diameter substantially greater than the inside diameter of the bore.

With the initial buckling of the neck portion 40 expanding the sleeve means 32, the further buckling of the second stage 40b of the neck portion forms at least one circumferential fold 55a to the sleeve 30 sufficiently to cause the radial shoulder 46 of the nut portion 38 to clamp the ring means 32 firmly against the far side of the work material as shown in FIG. 4. It is to be noted that the head 54 of the core bolt is of sufficient diameter not only to engage the trailing end of the sleeve 30, but also to engage the near face 56 of the work material as shown in FIG. 4 so that the head of the core bolt as well as the serrated enlargement 42 of the sleeve prevents axially inward movement of the sleeve in the course of the tightening action of the core bolt.

With the core bolt 52 tightened as shown in FIG. 4, the fastener serves the purpose of effectively securing the two plates 34 together. It is to be noted that the body portion 36 of the sleeve 30 is not weakened by either an internal screw thread or an external screw thread. It is also noteworthy that the body portion of the sleeve together with the core bolt 52 spans the bore with solid metal for maximum shear strength. A further advantage is that the head of the core bolt may engage the near face 56 of the work material with sufficient pressure to seal off the bore 35.

After the sleeve 30 is completely installed by the final tightening of the core bolt 52, the core bolt may be unscrewed and withdrawn from the sleeve to leave the fastener assembly that is shown in FIG. 5. The fastener assembly shown in FIG. 5 not only serves as means to clamp together the two plates 34, but also serves as a blind nut means to receive a longer core bolt for the purpose of attaching some object to the work material. For example, FIG. 6 shows how a core bolt 52a may be threaded into the nut portion of the sleeve shown in FIG. 5 for the purpose of anchoring a thin sheet 58 to the work material. The core bolt 52a may be a previously described core bolt 52 or may be a substituted longer core bolt.

When the split ring 32 is expanded by the outward bulging of the neck material of the sleeve 30, the split ring is not only expanded in diameter, but is also shifted laterally in the direction that is diametrically opposite from the gap between the confronting ends 50 of the split ring. A feature of the invention in this regard is that the split ring may have relatively high resiliency so that the expanded split ring has a strong tendency to contract. As a consequence the expanded ring tends to squeeze the bulged neck portion of the sleeve 30 and thus squeezes the buckled neck portion of the sleeve against the core bolt 52 for frictional locking action on the core bolt.

FIGS. 8, 9 and 10 illustrate the fact that the expandable ring means may comprise a pair of special split rings 60. Each of the two split rings 60 has a circumferential extent somewhat greater than 180° and the inside radius of curvature of the two rings is substantially equal to the outside radius of curvature of the first stage 40a of the neck portion 40 of the sleeve. Thus the three radii designated R in FIG. 9 are all equal. so that each of the split rings embraces the neck portion of the fastener sleeve in a manner that prevents separation of the split ring from the sleeve portion. Two blunt ends 62 of the respective split rings 60 abut each other and the other two ends 64 of the rings are reduced in thickness to permit the two ring ends to overlap as shown in FIG. 10. Since two cooperating split rings are employed, each ring need not be of much greater circumferential extent than 180° with a relatively large gap between its ends. Consequently, the spreading of each ring required to assemble it to the sleeve may be of small magnitude and easily within the elastic limits of the ring.

FIG. 11 shows how a fastener sleeve 30a of the character described may be formed with a circumferential enlargement 65 to serve the same purpose as the previously described serrated rim enlargement 42. The circumferential enlargement 65 has a cylindrical portion 66 and an adjacent tapered leading shoulder portion 68. In FIG. 11 only the tapered leading shoulder portion 68 has been driven into the bore 35 but when the sleeve is driven to its final installed position, the outer end or trailing end of the sleeve is substantially flush with the near face 56 of the work material.

In FIG. 11 the enlargement 68 is at the trailing end of the sleeve 30a. In FIG. 12 a fastener sleeve 30b is formed with a similar circumferential enlargement 65a with a cylindrical portion 66a and a tapered leading shoulder portion 68a but in this instance, the circumferential enlargement is shifted a substantial distance away from the trailing end of the sleeve. Here again, when the sleeve 30b is completely installed the trailing end of the sleeve is substantially flush with the near face 56 of the work material.

FIG. 13 shows how the first embodiment of the invention shown in FIGS. 1 to 7 may be installed in a bore 70 in work material 72 with the work material counterbored to form an annular recess 74. An anchoring ring 75 of soft material such as lead, copper or aluminum is placed in the annular recess 74 in advance of the insertion of the fastener sleeve 30 and then the fastener sleeve is driven flush with the work material to drive the serrated circumferential enlargement 42 into engagement with the anchoring ring 75. The anchoring ring 75 is so dimensioned relative to the annular recess 74 and relative to the circumferential enlargement 42 as to cause the ring to be radially compressed against the surrounding wall of the annular recess, the anchoring ring thus being effective to lock the sleeve 30 against rotation relative to the work material. When the sleeve 30 is driven to its installed position, the rim enlargement 42 seats against the inner rim of the annular recess 74 to serve as positive means to prevent further axial movement of the sleeve inwardly of the bore 70 as may be seen in FIG. 14.

FIG. 15 shows how a fastener assembly with the core bolt included may be mounted flush with the near face 56 of the work material. In FIG. 15 the work material has the usual bore 76 and the work material is counterbored to form a conical entrance 78 to the bore. The trailing end of the sleeve 30c is internally beveled to form an annular beveled surface 80 that is a continuation of the conical entrance 78 when the conical sleeve is driven to its installed position. At the installed position of the sleeve, the serrated rim enlargement 82 of the sleeve is in anchoring engagement with the work material. The core bolt 84 in FIG. 15 has a conical head 85 that mates with the flared entrance 78, the conical head being a Phillips head to cooperate with a Phillips screwdriver in a well-known manner.

FIGS. 16 to 21 illustrate various ways in which the nut portion of a fastener sleeve may be deformed for frictional locking engagement with a core bolt. FIG. 17 shows how a nut portion 38a of a fastener sleeve 30d may be driven into the opening 86 of a forming die 88 to contract the leading end of the nut portion on the core bolt. As shown in FIGS. 16 and 17, a core bolt 90 may be screwed far enough into the nut portion 38a to serve as means for driving the nut portion into the forming die 88. The final configuration of the nut portion 38a is shown in FIG. 17.

FIG. 18 is similar to FIG. 16 except for the fact that the opening 92 of a forming die 94 is tapered to tend to form the nut portion 38b of a fastener sleeve 30e to the tapered configuration shown in FIG. 19.

FIG. 20 shows how the nut portion 38c of a fastener sleeve 30f may be formed initially with a tapered configuration for cooperation with the cylindrical opening 86 in the previously described forming die 88. After the forming operation, the leading end of the nut portion 38c is of uniform outside diameter as shown in FIG. 21 but the inside diameter is progressively reduced to a slight degree towards the leading end of the nut portion to provide the desired locking action on the cooperating core bolt.

FIGS. 22 and 23 show how an embodiment of the blind fastener may be made of relatively short axial dimension for mounting in a bore 95 of relatively thin work material such as a relatively thin plate 96. The fastener sleeve 100 in FIGS. 22 and 23 has the usual two stage neck portion 102 and the usual leading nut portion 104 with the neck portion embraced by a ring means 32 in abutment with the usual rearwardly facing radial shoulder 105 of the nut portion. The main body portion of the fastener sleeve 100 is formed with a previously described enlargement 65 shown in FIG. 15, the circumferential enlargement having the usual cylindrical portion 66 and tapered leading shoulder portion 68. In this instance the circumferential enlargement 66 is of substantially the same axial extent as the fastener sleeve 100. In FIG. 23 the fastener sleeve 100 has been contracted by a core bolt 106 to expand the ring means 32 and to clamp the expanded ring means against the far face of the work material.

An important feature of the invention is that the fastener sleeve 100 shown in FIGS. 22 and 23 may be used with work material of any thickness greater than the minimum thickness shown in FIG. 22 by simply adding an auxiliary sleeve that is dimensioned in length in accord with the greater thickness. Thus, auxiliary sleeves of various lengths may be used interchangeably as adapters to enable the fastener shown in FIG. 22 to serve the purpose of a whole series of fasteners to be used for whole series of thicknesses of work materials.

In FIG. 24, for example, the work material comprises two plates 108 having a combined thickness much greater than the thickness of the single plate 96 in FIG. 22. To adapt the relatively short fastener of FIG. 22 to serve the same purpose as a longer fastener, a plain auxiliary sleeve 110 is interposed between the trailing end of the short fastener and the head 112 of a suitably dimensioned core bolt 114. With this assembly installed in a bore 115 of the work material in the manner shown in FIG. 24, the core bolt 114 is tightened to cause longitudinal contraction of the sleeve 100 in the usual manner.

FIG. 25 shows how the neck portion 116 of a fastener sleeve 118 of the character described may be provided with a tapered shoulder 120 to facilitate radial expansion of the split ring 122. The tapered shoulder 120 is provided by simply forming the neck portion 116 with a circumferential enlargement of V-shaped cross sectional configuration. When the fastener sleeve 118 is contracted longitudinally by means of a core bolt 124 in the previously described manner, the buckling of the first stage of the neck portion of the sleeve 116 initiates expansion of the split ring 22 and the shortening of the neck portion by the buckling action causes the radial driving shoulder 125 of the nut portion 126 of the sleeve to drive the split ring axially up the tapered shoulder 120 so that the expansion of the split ring is accomplished in part by buckling of the neck portion of the sleeve and is accomplished in further part by the tapered shoulder 120 serving as a conical wedge against the split ring.

The construction shown in FIG. 26 is similar to the construction shown in FIG. 25, as indicated by the use of corresponding numerals to indicate corresponding parts. The only difference between FIG. 26 and FIG. 25 is that the circumferential enlargement of the neck portion 116a that forms the tapered shoulder 120a is of a configuration to provide the enlargement with an abrupt rearwardly facing circumferential shoulder 128. With the split ring 122a advanced into the region of the circumferential shoulder 128, the circumferential shoulder tends to dig into the material of the split ring to resist retraction of the split ring.

FIG. 27 shows how a sleeve 30c may be substituted for the sleeve 30b in FIG. 11. The main body portion of the sleeve 30c is tapered in the same general manner as a standard tapered pin. Forcibly driving the slightly tapered sleeve into a properly tapered bore 140 in work material effectively anchors the sleeve against rotation relative to the work material.

My description in specific detail of the selected embodiments of the invention will suggest various changes, substitutions and other departures from my disclosure within the spirit and scope of the appended claims.

I claim,

1. In a blind fastener for installation in a bore through work material, the combination of:
   a fastener sleeve of a diameter to enter the bore,
   said sleeve being divided longitudinally into a main body portion, a collapsible neck portion, and a nut portion at its leading end, the nut portion being formed with an internal screw thread,
   said body portion being dimensioned in length to occupy the bore with the neck portion and the nut portion extending beyond the far face of the work material,
   said neck portion being of substantially smaller outside diameter than the body portion and of substantially lesser wall thickness;
   expansile ring means embracing said neck portion and having an initial outside diameter to pass through said bore,
   said nut portion being formed with a rearwardly facing outer circumferential driving shoulder to abut the far side of the ring means; and
   a core bolt to fit into said sleeve from the trailing end of the sleeve for screw engagement with said internal screw thread,
   said core bolt having a head larger in cross section than the cross section of the trailing end of the sleeve to abut the trailing end of the sleeve to cause longitudinal contraction of the sleeve in response to screw threaded advance of the core bolt into said internal screw thread,
   said sleeve being cooperative with said ring means to expand the ring means to a greater outside diameter than the inside diameter of the bore in response to longitudinal contraction of the sleeve,
   whereby the longitudinal contraction of the sleeve by the core bolt collapses said neck portion, expands the ring means and causes said shoulder of the nut means to clamp the expanded ring means against the far side of the work material.

2. A combination as set forth in claim 1 in which said head of the core bolt is larger in cross section than said bore whereby the head of the bolt engages the near side of the work material as well as the trailing end of the sleeve to anchor the sleeve against axial movement inwardly of the bore.

3. A combination as set forth in claim 1 in which expansile ring means includes a resilient C-shaped ring of substantially less than 360° circumferential extent whereby the radial outward bulging of the neck portion of the sleeve against the inner circumference of the ring means shifts the ring means radially in addition to expanding the ring means.

4. A combination as set forth in claim 1 in which said ring means includes a split ring;
   in which the ends of the split ring are spaced apart by less than the outside diameter of the neck portion for positive engagement with the neck portion;
   and in which the spreading of the ends of the split ring for assembly of the split ring to the neck portion of the sleeve stresses the split ring within the elastic limits of the split ring.

5. A combination as set forth in claim 4 in which the expansile ring means comprise a pair of split rings each of greater than 180° circumferential extent but of substantially less than 360° circumferential extent, with the two ends of each ring spaced apart by less than the outside diameter of the neck portion of the sleeve for positive engagement with the neck portion.

6. A combination as set forth in claim 5 in which said rings are positioned with an end of one ring overlapping an end of the other ring, the overlapping end portions being reduced in axial dimension to permit the two rings to be axially coextensive and to form shoulders on the two rings adjacent the overlapping ends to keep the two rings in positions confronting each other.

7. A combination as set forth in claim 6 in which the second end of each split ring is a blunt end, the two blunt ends of the two split rings confronting each other when the other ends of the two rings overlap each other.

8. In a blind fastener for installation in a bore through work material, the combination of:
   a fastener sleeve of a diameter to enter the bore,
   said sleeve being divided longitudinally into a main body portion, a collapsible neck portion and a nut portion at its leading end formed with an internal screw thread,
   said body portion being dimensioned in length to occupy the bore with the neck portion and the nut portion extending beyond the far face of the work material,
   said neck portion being of substantially smaller outside diameter than the body portion and of substantially lesser wall thickness; and
   expansile ring means embracing said neck portion and having an initial outside diameter to pass through said bore,
   said nut portion being formed with a rearwardly facing outer circumferential driving shoulder adjacent said neck portion having the ring means disposed thereon to drive the ring towards the body portion,
   said nut portion being formed with an internal screw thread of a minor diameter less than the inside diameter of the body portion and neck portion of the sleeve,
   whereby with the body portion of the sleeve positioned in the bore, a core bolt may be inserted into the sleeve from its trailing end into screw engagement with said internal thread and may be tightened against the trailing end of the sleeve to collapse the thinned neck portion of the sleeve longitudinally by forming circumferential folds therein with the folds bulging radially outward, the outward bulging of the folds expanding the ring to greater outside diameter than the inside diameter of the bore and the longitudinal contraction of the neck portion causing the driving shoulder of the nut portion to drive the expanded ring against the far face of the work material.

9. A combination as set forth in claim 8 in which said body portion has a circumferential enlargement to engage the work material to resist axial movement of the body portion inwardly of the bore.

10. A combination as set forth in claim 9 in which said circumferential enlargement of the body portion is in the form of an enlarged rim at the rear end of the body portion of the sleeve, the outside diameter of the rim slightly exceeding the inside diameter of the bore whereby driving the enlargement into the bore anchors the sleeve in the bore.

11. A combination as set forth in claim 10 in which said rim is formed with longitudinal serrations to bite into the wall of the bore.

12. A combination as set forth in claim 9 in which said circumferential enlargement has a smooth tapered leading shoulder for wedging action in the bore.

13. A combination as set forth in claim 12 in which said circumferential enlargement is at the rim of the trailing end of the sleeve.

14. A combination as set forth in claim 12 in which said circumferential enlargement is at a point intermediate the length of the body portion of the sleeve.

15. A combination as set forth in claim 8 in which the near end of the bore is counterbored to form an annular recess around the bore on the inner face of the work material;
which includes a deformable ring to seat in said annular recess; and
in which said body portion of the sleeve is formed with a circumferential enlargement in the form of an enlarged rim at the trailing end of the sleeve,
said annular recess, deformable ring and circumferential enlargement being shaped and dimensioned to cause the enlargement to compress the deformable ring radially in the annular recess to anchor the sleeve against rotation and to cause the enlargement to seat against the bottom of the recess when the sleeve is forcibly driven into its installed position in the bore.

16. A combination as set forth in claim 15 in which said circumferential enlargement is formed with longitudinal serrations to bite into the deformable ring.

17. A combination as set forth in claim 15 in which said circumferential enlargement is formed with a tapered leading shoulder for wedging action against the deformable ring.

18. A combination as set forth in claim 8 in which said body portion is without screw threads.

19. A combination as set forth in claim 8 in which the inner circumference of said nut portion of the sleeve is deformed for self-locking cooperation with the core bolt.

20. A combination as set forth in claim 8 in which the combination includes the core bolt.

21. A combination as set forth in claim 20 which includes a second larger core bolt to be substituted for the first core bolt to anchor an object to the work material after the sleeve is contracted by the first core bolt.

22. A combination as set forth in claim 20 in which said core bolt has a head of larger cross sectional dimension than the bore for tightening action against the rim of the bore as well as against the trailing end of the sleeve.

23. A combination as set forth in claim 8 in which said sleeve is dimensioned in length for use in a bore of a relatively short axial dimension; and
which includes an auxiliary sleeve in abutment with the trailing end of the fastener sleeve,
said auxiliary sleeve being of a length to cooperate with the fastener sleeve in a bore longer than said given bore,
whereby auxiliary sleeves of various lengths may be used interchangeably to adapt the fastener for use in bores of various lengths.

24. A combination as set forth in claim 8 in which said neck portion is formed with a tapered external enlargement of less outside diameter than the inside diameter of the bore for expanding cam action on the ring in response to axial contraction of the neck portion.

25. A combination as set forth in claim 24 in which said external enlargement is a rib of V-shaped cross section.

26. A combination as set forth in claim 8 in which the neck portion of the sleeve is formed with a circumferential enlargement of an outside diameter less than the inside diameter of the bore, said enlargement having a tapered leading shoulder for expanding cam action on said ring, said enlargement having an abrupt trailing shoulder.

27. A combination as set forth in claim 8 in which the thickness of the wall of the neck portion of the sleeve increases by stages towards the body portion of the sleeve whereby the neck portion collapses by stages with the first stage causing initial expansion of said ring means.

28. A combination as set forth in claim 27 in which said first stage is shaped and dimensioned to serve primarily to expand the ring means, the next stage serving to permit final longitudinal contraction of the neck portion to force the expanded ring against the far face of the work material.

29. A combination as set forth in claim 28 in which said expansile ring means comprises split ring means.

30. A combination as set forth in claim 8 in which said ring means includes a split ring which is sufficiently resilient to resist expansion by the neck portion whereby the expanded ring means presses the folded neck portion inwardly for locking action on the core bolt.

31. A combination as set forth in claim 8 in which said ring means comprises two split rings each of greater extent than 180°, said two rings having one pair of abutting ends and one pair of overlapping ends.

32. A combination as set forth in claim 1 in which the bore has a flared entrance and the core bolt has a conical head which seats in the flared entrance substantially flush with the near face of the work material.

33. A combination as set forth in claim 1 in which at least a portion of the sleeve is tapered longitudinally to cause the sleeve to wedge into the bore to hold the sleeve against rotation relative to the work material.

34. A combination as set forth in claim 33 in which the sleeve is tapered over substantially the whole length of the main body portion of the sleeve.

35. A combination as set forth in claim 34 in which the bore is tapered.

36. In a blind fastener for installation in a bore of a workpiece, the combination of:
a fastener body of an outside diameter to fit into the bore,
said body having a longitudinal passage therethrough,
the inner leading end portion of said passage being formed with an internal screw thread and the remainder of the passage having a diameter at least as large as approximately the major diameter of said internal screw thread,
an intermediate portion of the body being reduced in thickness to form a neck with a wall thin enough to collapse and crumple in response to substantial longitudinal contraction force,
said neck forming a forwardly facing outer circumferential shoulder and a rearwardly facing outer circumferential shoulder,
at least one of said two outer circumferential shoulders being externally tapered towards the neck;
an externally threaded pull member to fit into said passage from the trailing end thereof for screw engagement with said internal screw thread to exert longitudinal contraction force on the body; and
ring means embracing said neck in abutment with said rearwardly facing outer circumferential shoulder and having an initial outside diameter less than the inside diameter of the bore, said ring means being expansile to engage the workpiece in response to the longitudinal contraction of the body and collapse of said neck by the pull member.

37. A combination as set forth in claim 36 in which said pull member has an enlargement greater than the diameter of said passage to create force against the trailing end of the body for the purpose of creating said longitudinal contraction force.

38. A combination as set forth in claim 36 in which the body is shaped and dimensioned to seat in the bore in engagement with the workpiece when forced axially into the bore with the engagement effective to resist rotation of the body relative to the workpiece in reaction to the threading of the pull member into said internal screw thread.

* * * * *